United States Patent
Sherman

(10) Patent No.: US 7,324,950 B2
(45) Date of Patent: Jan. 29, 2008

(54) SYSTEM AND METHOD FOR SIMULTANEOUS MULTIPLE DEATH LIFE INSURANCE

(75) Inventor: Lawrence M. Sherman, Westport, CT (US)

(73) Assignee: Value-Security, L.L.C., Westport, CT (US)

( * ) Notice: Subject to any disclaimer, the term of this patent is extended or adjusted under 35 U.S.C. 154(b) by 1031 days.

(21) Appl. No.: 09/781,132

(22) Filed: Feb. 9, 2001

(65) Prior Publication Data
US 2001/0034620 A1 Oct. 25, 2001

Related U.S. Application Data

(60) Provisional application No. 60/181,649, filed on Feb. 10, 2000.

(51) Int. Cl.
*G06Q 10/00* (2006.01)
(52) U.S. Cl. .................... 705/4; 705/2; 705/3
(58) Field of Classification Search ........... 705/2–4
See application file for complete search history.

(56) References Cited

U.S. PATENT DOCUMENTS

| | | | |
|---|---|---|---|
| 5,655,085 A | 8/1997 | Ryan et al. | 364/401 |
| 5,752,236 A | 5/1998 | Sexton et al. | 364/401 |
| 5,845,256 A * | 12/1998 | Pescitelli et al. | 705/4 |
| 5,873,066 A | 2/1999 | Underwood et al. | 705/4 |
| 5,907,828 A | 5/1999 | Meyer et al. | 705/4 |
| 5,913,198 A | 6/1999 | Banks | 705/4 |
| 5,926,800 A | 7/1999 | Baronowski et al. | 705/35 |
| 6,584,446 B1 * | 6/2003 | Buchanan et al. | 705/4 |

OTHER PUBLICATIONS

Anonymous, "Manhattan Life Insurance Company;" Financial Services Week, p. 23, Aug. 23, 1992; ISSN: 0895-8440. From Dialog File 16 (Gale Group); Dialog ID No. 02461429.*
"Benefits of survivorship life insurance," Healthcare Financial Management, by William Kistner, vol. 49, No. 8,p. 84-85; Aug. 1995, ISSN: 0735-0732. Dialog ID No. 01080480. (From Dialog File No. 15: ABI/Inform®).*

* cited by examiner

*Primary Examiner*—C. Luke Gilligan
*Assistant Examiner*—Vivek Koppikar
(74) *Attorney, Agent, or Firm*—Carol H. Peters, Esq.; Mintz, Levin, Cohn, Ferris, Glovsky and Popeo, P.C.

(57) ABSTRACT

The invention provides a system and method for multiple death life insurance in the event of simultaneous or coincident death of two or more insured parties, or a defined group of two or more insured parties. More particularly, embodiments of the invention provide a computer system and method for providing simultaneous multiple death life insurance designed to provide benefits to alleviate the financial burden experienced by beneficiaries as a result of simultaneous or coincident of two or more insured parties. Simultaneous multiple death life insurance according to the invention may be obtained through the internet by remote computers and internet access devices well known in the art.

15 Claims, 2 Drawing Sheets

SYSTEM AND METHOD FOR SIMULTANEOUS MULTIPLE DEATH LIFE INSURANCE

CLAIM OF PRIORITY TO PRIOR APPLICATION

This application claims priority under 35 U.S.C. § 119(e) to U.S. provisional patent application Ser. No. 60/181,649, filed on Feb. 10, 2000, incorporated herein by reference.

FIELD OF THE INVENTION

The invention generally relates to a system and method for providing life insurance for a multiple of two or more persons. More particularly, the invention provides a computer system and method for providing multiple death life insurance in the event of simultaneous or coincident death of at least two persons.

BACKGROUND OF THE INVENTION

A wide range of life insurance products is currently available in the insurance market, including various term life, ordinary life, whole life, and variable life insurance policies, which provide a variety of terms and benefits to suit the insurance and investment needs of consumers. However, life insurance providing death benefits for the unlikely event of simultaneous or coincident death of two or more insured parties as a single, stand-alone plan is not available. Life insurance currently available providing death benefits in the event of death of two insured parties includes coverage referred to as survivorship, joint last-to-die or second-to-die life insurance. Survivorship plans are typically provided for at least two people and pay benefits upon the failure of the two-person or joint status of the plan. Death of the second or last person is a failure of the joint status, triggering payment of death benefits.

Underwriting and management of survivorship plans requires insurance companies to determine cost-of-insurance rates based upon the characteristics of the insured parties comprising the joint status. Insurance companies must maintain up-to-date information on the insured parties with respect to their current survival status, which is particularly important in the event of death of the first of the two insured parties. The event of death of the first insured party may change the mortality and characteristics of the surviving second insured party. The costs associated with underwriting and managing survivorship plans, as well as the costs associated with marketing and selling insurance, comprise a substantial portion of the relatively high premiums survivorship plans command. Premiums are also affected by the relatively high limits of survivorship plans.

Although survivorship plans pay benefits upon the failure of the joint status as a consequence of simultaneous death, survivorship plans are not designed to address the unique financial implications associated with simultaneous or coincident death of two or more insured parties. Survivorship plans are not intended to provide benefits to cover the special financial needs of beneficiaries as a result of simultaneous death of two or more insured parties, particularly if insured parties are essential to the financial support or financial health of beneficiaries. Survivorship plans may be linked to additional benefits providing financial resources for the unique and special circumstances of simultaneous death. However, premiums for such additional coverage would not be affordable to a large majority of potentially insurable lives.

SUMMARY OF THE INVENTION

The invention provides a method for providing life insurance for simultaneous death of a multiple of insured parties comprising obtaining information about each party for establishing the eligibility of the parties and certifying the parties are in good health by comparing the information received with predetermined standards, and, upon meeting the predetermined standards, issuing a simultaneous multiple death life insurance plan to the parties.

The invention also includes a computer system for providing simultaneous multiple death life insurance to a multiple of insured parties. In one embodiment of the invention, simultaneous multiple death life insurance is provided as a single, independent or stand-alone plan comprising at least one insurer, at least two parties, or a defined group of parties, and at least one beneficiary. The simultaneous multiple death life insurance plan further comprises a premium obligation amount, a death benefit amount of a fixed value, a term of a specified time during which the life insurance plan is valid, an obligation of the insured parties to pay the premium obligation amount, and an obligation of the insurer to pay the death benefit amount to the beneficiary upon simultaneous death of the insured parties. The simultaneous multiple death life insurance plan may define simultaneous death as death of two or more insured parties as a result of a common cause or event, or death of the two or more insured parties within a specified period of time as a result of a common cause or event, or from any cause or event. Simultaneous death may be further defined to include permanent incapacity of one insured party followed by the death of another insured party within a specified period of time as a result of a common cause or event, or from any cause or event. The simultaneous multiple death life insurance plan includes at least two insured parties who are related to each other and the beneficiary by a family relationship or a business endeavor, or some other existing or future financial relationship.

The simultaneous multiple death life insurance plan of the invention is formed and managed by the computer system, wherein an underwriting insurer initially obtains from at least two persons underwriting information to assess the eligibility of the two persons in accordance with predetermined standards. In addition to the minimum underwriting information required to establish eligibility of the two persons. The underwriting information and the definition of simultaneous death are furnished to the computer system, wherein the single, independent simultaneous multiple life insurance plan is formed.

In other embodiments of the invention, the information required by the underwriting insurer to issue a simultaneous multiple death life insurance plan may be provided by at least two persons to the underwriting insurer or the computer system of the invention through the internet from remote computers and other internet access devices well known in the art.

BRIEF DESCRIPTION OF THE DRAWINGS

For a better understanding of the invention, reference is made to the drawings which are incorporated herein by reference and in which.

DETAILED DESCRIPTION OF THE INVENTION

Figure 1:
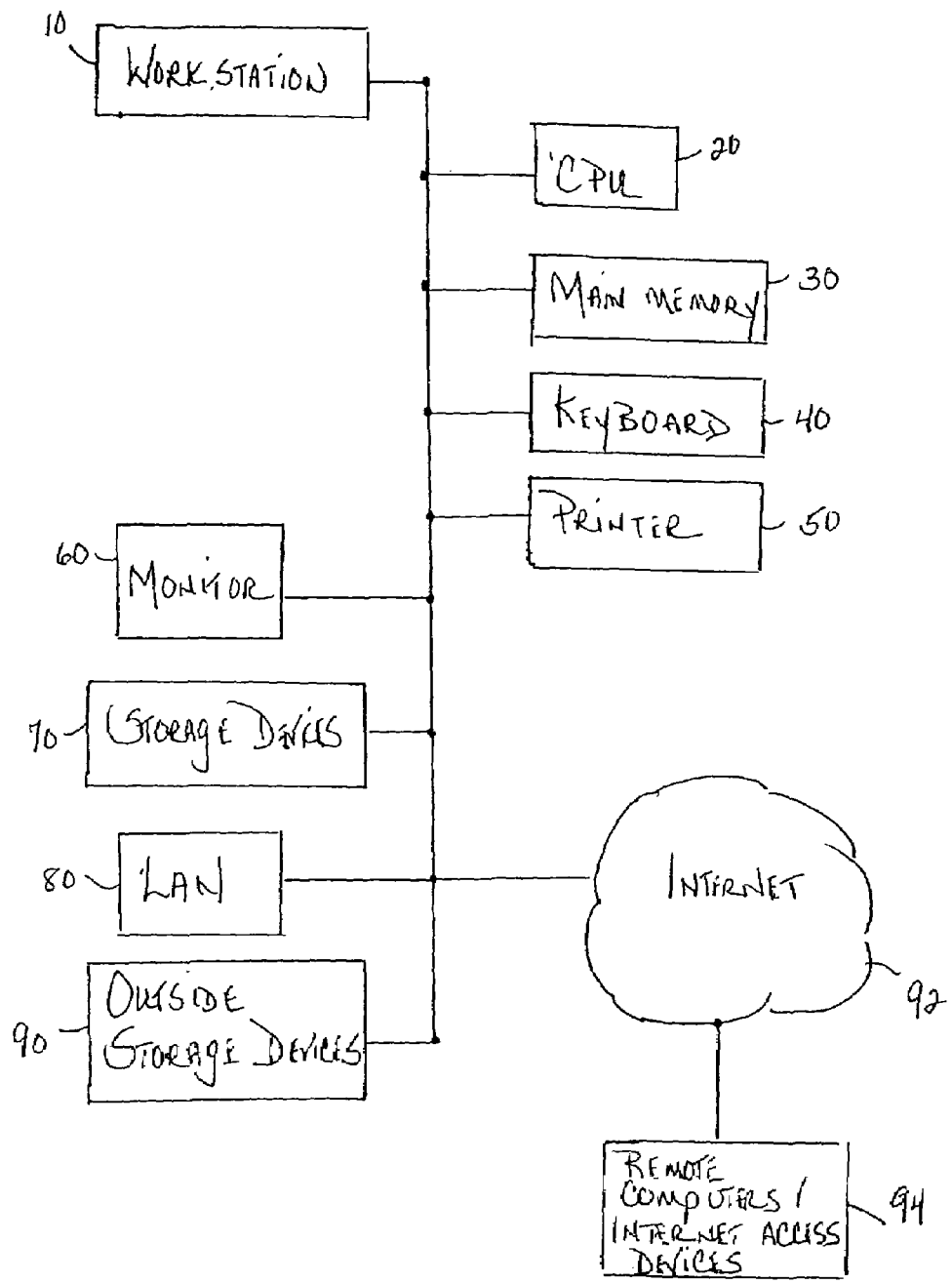
FIG. 1 is a hardware block diagram illustrating the operation of a computer system for providing simultaneous multiple death life insurance in accordance with a first embodiment of the invention.

Illustrative embodiments of the invention described herein provide a system and method for providing death benefits to one or more beneficiaries in the event of simultaneous or coincident death of a multiple of insured parties. More particularly, the invention provides a computer system and method providing simultaneous multiple death life insurance as a single, independent or stand-alone life insurance plan providing death benefits to mitigate the unique financial burden experienced by beneficiaries as a result of simultaneous death of two or more insured parties. The computer system and method may provide simultaneous multiple death life insurance for two or more insured parties who are related to each other and the beneficiaries by a family relationship or a business endeavor.

Embodiments of the invention provide a computer system and method for simultaneous multiple death life insurance which is easily-obtainable by consumers for low-cost premiums and minimum qualifying underwriting requirements. Embodiments of the invention also provide a computer system and method for providing simultaneous multiple death life insurance as a single, independent or stand-alone life insurance plan. In embodiments of the invention simultaneous multiple death life insurance may not be associated with other life insurance plans held by the insured parties, nor requires the insured parties to purchase copending life insurance plans or other insurance products. In addition, embodiments of simultaneous death life insurance according to the invention may provide coverage to two or more insured parties irrespective of the eligibility of the insured parties for other insurance products. In addition, death benefits provided by embodiments of simultaneous multiple death life insurance according to the invention are independent of payment of death benefits by other life insurance plans. The computer system and method of the invention, therefore, provide a separate, stand-alone simultaneous multiple death life insurance providing death benefits to one or more beneficiaries for simultaneous or coincident death of two or more insured parties independent of the eligibility requirements and benefit payments of other life insurance coverage held by the insured parties.

Embodiments of the invention will be described with reference to FIGS. 1-2 which are presented herein for the purpose of illustrating embodiments and are not intended to limit the scope of the claims.

Definitions

The terms defined below are used herein for the purpose of illustrating embodiments and are not intended to limit the scope of the invention.

As used herein to describe the embodiments of the invention, the term "simultaneous death" refers to: 1.) simultaneous or coincident death of two or more designated insured parties, or a specified number of designated insured parties of a defined group, as a result of a common cause or event (non-independent simultaneous death); 2.) death of two or more designated insured parties, or a specified number of designated insured parties in a defined group, within a specified period of time, e.g. three months, as a result of a common cause or event, or from any cause or event (independent simultaneous death); 3.) permanent incapacity of one or more designated insured parties following death of one or more designated insured parties within a specified period of time, e.g. three months, as a result of a common cause or event, or from any cause or event; and 4.) death of one or more designated insured parties following permanent incapacity of one or more designated insured parties within a specified period of time, e.g. three months, as a result of a common cause or event, or from any cause or event.

The term "defined group" refers to two or more designated insured parties characterized by a given relationship between insured parties and/or their relationship to one or more persons or entities outside the defined group, including one or more beneficiaries.

The term "permanent incapacity" refers to substantial illness or substantial bodily harm or injury, and any resulting illness therefrom, which renders a designated insured party substantially temporarily or permanently impaired or disabled to the extent death is expected to result within a specified period of time, e.g. six or twelve months.

The term "designated" refers to any item appointed, specified or described in the simultaneous multiple death life insurance.

Referring to FIG. 1, a hardware block diagram illustrates a first embodiment of the invention of a computer system for providing simultaneous multiple death life insurance in accordance with a first embodiment of the invention comprising a typical computer workstation 10 containing a central processing unit (CPU) 20, an input device, such as a keyboard 40 or mouse, an output device such as computer monitor screen 60, a printer 50, and one or more storage devices 70. A typical workstation is a personal computer, such as a Dell personal computer, with an Intel Pentium microprocessor. The system may be coupled to a Local Area Network 80 (LAN) or other communication channels for receiving and transmitting information to and from potential and existing insured parties, and to provide access to data stored in outside storage devices 90. In addition, the computer system may be coupled to an intranet or the internet 92 to allow prospective insured parties and to inquire about and/or to subscribe to simultaneous multiple death life insurance through the internet 92 from remote computers and other internet access devices 94 well known in the art.

Figure 2:
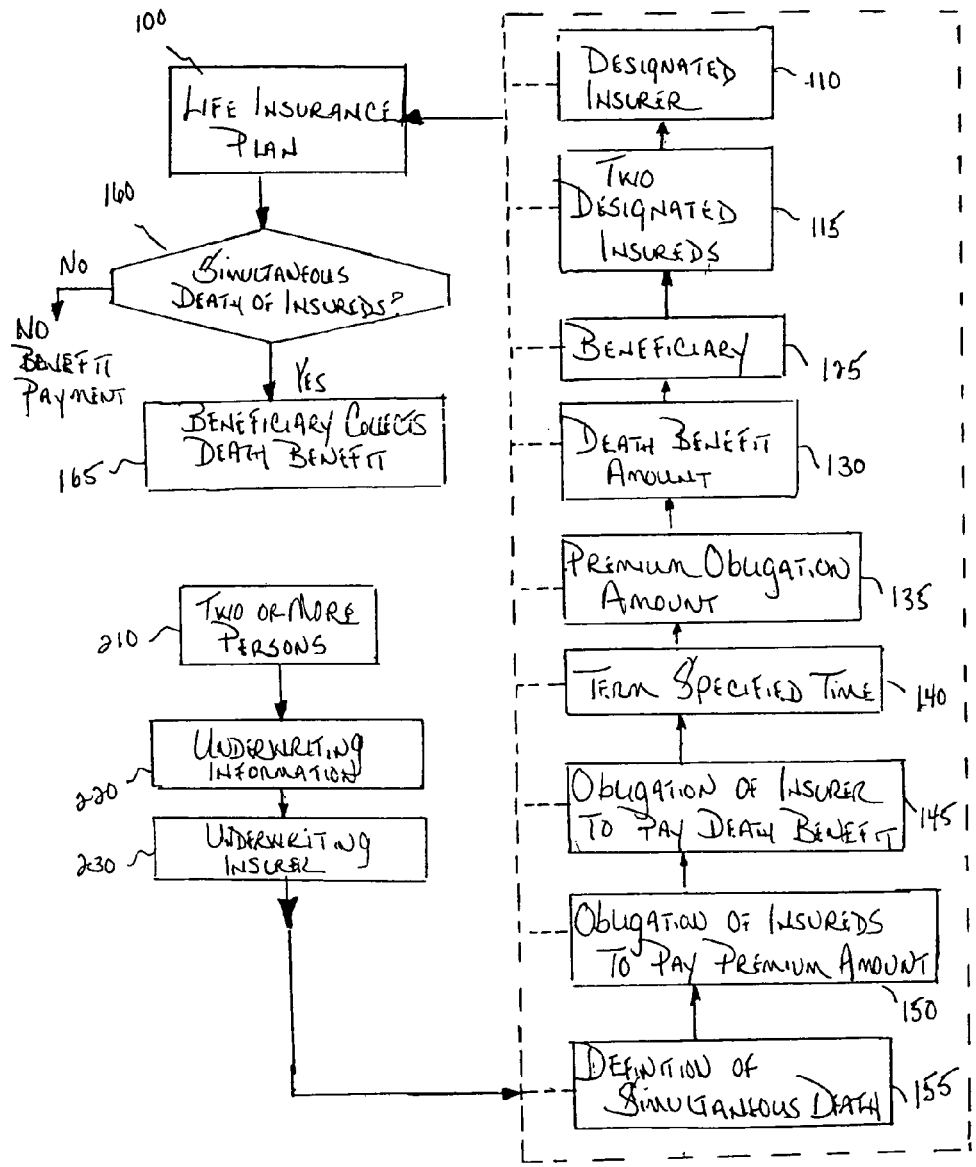
FIG. 2 is a flow diagram of a computer system for providing simultaneous multiple death life insurance in accordance with the first embodiment of the invention.

Referring to FIG. 2, a flow diagram illustrates a system for forming and managing simultaneous multiple death life insurance in the first embodiment of the invention as a single, independent or "stand-alone" life insurance plan 100 with elements and information operators comprising at least one designated insurer 110; at least two persons identified as designated insured parties 115, or a multiple of persons identified as a defined group comprising at least two designated insured parties 115, at least one beneficiary 125, a death benefit amount 130 of a fixed value, a premium obligation amount 135; a term 140 of a specified time during which the life insurance plan 110 is valid, an obligation 145 of the insurer 110 to pay the death benefit amount 130 to the beneficiary 125 upon simultaneous death 155 of the insured parties 115, and an obligation of the insured parties 115 to pay the premium obligation amount 135.

As shown in FIG. 2, underwriting information 220 is initially obtained from two or more persons 210 and provided to an underwriting insurer 230 to assess the eligibility of the two or more persons 210 for simultaneous multiple death life insurance in accordance with predetermined standards. The amount of underwriting information 220 required by the underwriting insurer 230 may be no more than completion of an application by the two or more persons 210, wherein, for example, one or more anti-selection questions are included to establish if a minimum level of eligibility of the two or more persons 210 has been met according to the predetermined standards. The underwriting insurer 230 obtaining such information may include, although is not limited to, insurance providers, insurance companies, insurance brokers and agents, as well as other service providers, including, although not limited to, providers of financial investment services, banking services, credit services and other financial service providers offering consumer financial services. The underwriting information 230 is furnished to the computer system of the first embodiment, wherein the single, independent simultaneous life insurance plan 100 is formed. In other embodiments of the invention, the information required by the underwriting insurer 230 to issue simultaneous multiple death life insurance 100 may be provided by prospective insured parties 210 to the underwriting insurer 230 or the computer system of the invention through the internet 92 by remote computers and other internet access devices 94 well known in the art.

In the event of simultaneous or coincident death of two or more designated insured parties 115, or some threshold number of designated insured parties 115 of a defined group, as indicated by the terms and conditions of the simultaneous multiple death life insurance plan 100, the simultaneous multiple death life insurance plan 100 would distribute 165 death benefits 130 to the beneficiary 125 upon a confirmation 160 both deaths had occurred or that a conditions equivalent to death within the definition of simultaneous death 155 with respect to all the designated insured parties 115, or a threshold number of designated insured parties 115 of a defined group had occurred.

According to the first embodiment of the invention, simultaneous death 155 includes death of two or more designated insured parties 115, or all or some threshold number of designated insured parties 115 of a defined group, as a result of a common cause or event. The simultaneous multiple death life insurance plan 100 also considers simultaneous death 155 to include death of two or more insured parties, or all or some threshold number of insured parties of a defined group, within a specified period of time as a result of a common cause or event, or from any cause or event. In this instance, simultaneous death 155 occurs upon death of insured parties 115 within a specified period of time identified in the plan 100. The specified period of time is typically short, e.g. three months, to limit the time between death of a first insured party and death of a second insured party. Shortly-spaced death of two or more insured parties is included within the definition of simultaneous death 155 according to the invention, because the financial burden on the designated beneficiaries 125 under such circumstances is as great as the financial burden created by the simultaneous death 155 of insured parties as a result of a common cause or event. Therefore, upon death of two or more designated insured parties 115 within a period of three months, as a result of either a common cause or event or different causes or events, the plan 100 would provide benefits 130 to the designated beneficiaries 125. Although three months is a preferred period of time between death of insured parties as a condition equivalent to simultaneous death 155, the simultaneous multiple death life insurance plan 100 is not limited to any specific period of time between death of insured parties 115. However, in order to maintain the objective of low cost life insurance for the simultaneous death 155 of insured parties 115, the period of time between death of insured parties 115 may be relatively short to remain as a condition equivalent to simultaneous or coincident death.

As described above, simultaneous death 155 due to a common cause or event is considered non-independent simultaneous death occurring as a result of death of two or more designated insured parties 115 due to the same cause or event, such as a single travel accident, wherein the insured parties 115 are temporally and spatially proximate to each other. However, simultaneous death 155 also includes independent simultaneous death, wherein separate causes or events occur coincidentally and result in the coincident death of the insured parties 115. For example, independent simultaneous death occurs as a result of two or more insured parties 115 coincidentally killed in separate travel accidents, wherein the insured parties 115 are traveling at the same time by different means and possibly in different time zones. Independent simultaneous death, therefore, includes death of a first insured party followed by death of a second insured party within a specified period of time as a result of separate causes or events, as described above.

Upon the simultaneous death 155 of the designated insured parties 115, the simultaneous multiple death life insurance plan 100 provides benefits 130 to the designated beneficiaries 125 irrespective of death benefits distributed under other life insurance plans held by the insured parties 115. In this respect, the simultaneous multiple death life insurance plan 100 operates as an separate life insurance policy for the sole risk of simultaneous death 155, independent of the terms and conditions of other life insurance plans. The simultaneous multiple death life insurance plan 100 is best suited for providing death benefits 130 to alleviate the overall financial burden and short-term and long-term financial needs of the beneficiaries 125 arising out of the unlikely event of simultaneous death 155 of the insured parties 115.

The simultaneous multiple death life insurance plan 110 is designed to provide life insurance coverage to two or more persons 210 who are related to each other and/or the designated beneficiaries 125 as a result of a family or business relationship. In cases in which two or more persons 210 and the beneficiaries 125 are related, the two or more persons 210 are often essential to the financial support or financial health of the beneficiaries 125 such that the simultaneous death 155 of the two or more persons 210 would impose significant financial burdens upon the beneficiaries 125. The plan 100 provides benefits 130 to the beneficiaries 125 specifically to eliminate or at least substantially reduce such financial burdens. In this respect, the simultaneous multiple death life insurance plan 100 of the first embodiment may be limited to providing simultaneous multiple death life insurance to only those persons 210 who are related to each other and/or to the beneficiaries 125 by a family relationship or a business endeavor. However, it is understood that the relationships between the designated insured parties 115 and/or the beneficiaries 125 may include other relationships resulting from different circumstances and events than those described herein such that the multiple simultaneous death life insurance plan 100 may be provided to all types of insured parties and beneficiaries 125.

By way of example, a first aspect of the first embodiment of the invention includes two designated insured parties 115 related by a family relationship such as a husband-wife caretaking pair supporting minor children or a son-daughter caretaking pair supporting dependent elderly parents. In the event of the simultaneous death 155 of the insured parties 115, benefits 130 would be distributed to the beneficiary minor children and elderly parents as financial support to mitigate the financial burden and to meet the immediate financial needs created by such catastrophic loss. Benefit payments 165 may create financial resources to assure the financial security and future education of minor children and provide funds for immediate financial needs, such as child care services. Such benefit payments 165 would also ease the financial task for friends or family who assume responsibility or guardianship of beneficiary minor children. Benefit payments 165 to elderly parents would assure funds for the present and future housing needs of parents, as well as future nursing care and medical expenses.

Designated insured parties 115 may also be related to each other and/or the designated beneficiaries 125 by a business endeavor or common employment. By way of example, a second aspect of the first embodiment of the invention includes two or more persons 210 who are essential to a business or corporation, such as two partners of a business partnership, or chief executive and operating officers of a corporation. The simultaneous death 155 of the business partners and the officers can have severe financial consequences to the business partnership and its employees, and the shareholders of the corporation, as well as to the members of their families. Benefit payments 165 paid to beneficiary employees of the business partnership may help reduce such financial burdens as significant revenue losses and consequent employee lay-offs resulting from death of the business partners. Similarly, benefit payments 165 to beneficiary shareholders may help to offset increases in operating expenses to overcome the initial loss of executive management. In these cases, benefit payments 165 may also help to protect the family members of the business partners and the officers against a substantial loss of inheritance due to the shortened working life.

The simultaneous multiple death life insurance plan 100 also provides benefits 130 in the event of the simultaneous death 155 of a specified number of designated insured parties 115 comprising a defined group. By way of example, a third aspect of the first embodiment includes two or more insured parties 115 comprising a defined group, wherein the insured parties 115 may be characterized as "members" of the defined group under the terms and conditions of the plan 100 according to their relationship to each other and/or their relationship to one or more persons or entities outside the defined group. The members of the defined group may be related to each other and/or to one or more persons or entities outside the defined group as a consequence of a family or business relationship. Typically, the persons or entities outside of the defined group to whom the insured parties 115 are related are the designated beneficiaries 125 who have a substantial reliance upon the insured parties 115 for their financial support or financial health. Benefits 130 would be paid to the beneficiaries 125 upon the simultaneous death 155 of either all members of the defined group or, alternatively, a specified threshold number of members. For example, essential players and coaching staff of a professional sports team may be the designated insured parties 115 of a defined group whose simultaneous death 155 would have a negative financial impact on a beneficiary corporation owning the sports team. In the event of simultaneous death 155 of all members or a threshold number of members of the defined group, benefits 130 would be paid in full to the beneficiary corporation. However, in the event of the simultaneous death 155 of less than all members, or less than some threshold number of members, either no benefit is paid or a reduced or proportional benefit may be paid. A reduced or proportional benefit relates to a reduced financial impact and may be associated with an additional premium.

The simultaneous multiple death life insurance plan 100 may allow for the substitution of members of a defined group as designated insured parties 115 under circumstances in which a member is no longer eligible for inclusion in the defined group as a result of, for example, prior death, divorce, termination of employment, termination of partnership, etc. A new eligible member may be included in the defined group as a designated insured party 115 to substitute for the member who is no longer eligible. Substitution of designated insured parties 115 in a defined group also allows for changes occurring in the underlying operation of an entity, such as the beneficiary entity 125, to which the defined group is related. For example, members of a defined group may be added or removed as designated insured parties 115 to reflect the addition and deletion of partners in a business partnership or the replacement of key employees in a company. Substitutions of designated insured parties 115 and changes to the overall make-up of the defined group may include changes in premium to reflect a change in the nature of the risk the defined group represents. In other embodiments of the invention, substitution of members of the defined group of designated insured parties 115 may be accomplished by at least one of the designated insured parties 115 providing information concerning substitutions and changes to the defined group to the underwriting insurer 220 or the computer system of the invention through the internet 92 from remote computers and internet access devices 94 well known in the art.

A group of designated insured parties 115 may include a more complicated structure to cover a large number of insured parties. For example, a defined group may include ten designated insured parties 115 who are subdivided into four teams of three members each with one or two members belonging to more than one team. Benefits 130 would be provided to designated beneficiaries 125 for the simultaneous death 155 of one entire team. With payment of additional premium, additional benefits 130 may be available in the event of the simultaneous death 155 of more than one team. It is understood that other structures of a large defined group may be contemplated depending upon the level of financial loss resulting as a consequence of simultaneous death.

Although the simultaneous death 155 of two or more designated insured parties 115 often results in a severe financial burden to the designated beneficiaries 125, the financial burden resulting from the permanent incapacity of a designated insured party 115 occurring simultaneously with death of another designated insured parties 115 can be equally severe if not more severe to the beneficiaries 125. A severe financial burden would typically result when two or more insured parties 115 are responsible for providing full financial support to the designated beneficiaries 125, or are particularly essential to the financial health of the designated beneficiaries 125. Under a simultaneous multiple death life insurance plan 100, the permanent incapacity of a second insured party 115 following death of a first insured party 115 may not be covered if the permanent incapacity of the second insured party 115 does not produce death within a specified period of time. The simultaneous multiple death life insurance plan 100 under this circumstance would terminate and benefits 130 would not be paid to the beneficiaries 125. Should the specified period of time be limited to three months, death may not occur within such a short period, although the second insured party 115 is not likely to recover and eventual death of the second insured party 115 is expected. Therefore, the simultaneous multiple death life insurance plan 100 according to a fourth aspect of the first embodiment of the invention includes permanent incapacity of a second insured party 115 following death of a first insured party 115 as a condition equivalent to death and within the meaning of simultaneous death 155 in order to cover such instances in which the permanent incapacity of the second insured party 115 is likely to result in eventual death.

The permanent incapacity of an insured party 115, however, may be limited to a specified duration of time for qualification as a condition equivalent to death within the meaning of simultaneous death 155. For example, full benefits 130 would be paid to the beneficiaries 125 in the event the permanently incapacitated insured party 115 dies within a specified period of time, e.g. six or twelve months. While the permanently incapacitated insured party 115 is alive, partial benefits 130 may be paid to the beneficiaries 125 during the specified period with a balance of benefits 130 paid upon death of the insured party. Permanent incapacity may be defined by the simultaneous multiple death life insurance plan 100 to include substantial illness or substantial bodily harm or injury, and any resulting illness therefrom, which renders a designated insured party 115 substantially temporarily or permanently impaired or disabled to the extent death is expected to result within six or twelve months, or some other specified period of time according to the simultaneous multiple death life insurance plan 100.

Termination of the simultaneous multiple death life insurance plan 100 occurs with the singular death of a first designated insured party 115 followed by the survival of a second designated insured party 115 beyond a specified period of time, thereby eliminating the possibility of any death benefit claim under the simultaneous multiple death life insurance plan 110. An alternative to termination of the plan may include an offer to the surviving second insured party 115 to replace the first insured party 115 who has died with a new designated insured party 115 in order to continue simultaneous death coverage for a potential future claim. Another alternative to termination of the plan may include providing a right of the surviving insured party 115 to "convert" the simultaneous multiple death life insurance plan 100 into single life coverage with payment of an additional premium.

If the condition of permanent incapacity is included in the simultaneous multiple death life insurance plan 100 as a condition equivalent to death within the meaning of simultaneous death 155, the plan 100 would not automatically terminate after death of a first insured party 115 and the permanent incapacity of a second insured party 115, but, rather, would provide benefits to beneficiaries in the event death of the second insured party 115 is anticipated within a specified period of time, for example, within six or twelve months.

As described above, the simultaneous multiple death life insurance plan 100 is preferably designed for providing benefit payments 165 in the event of simultaneous death 155 of insured parties 115 who are related to each other and/or the beneficiaries 125 either by a family relationship or a business endeavor. Under these circumstances, the simultaneous multiple death insurance plan 100 may be limited to insuring only two persons, such as spouses, or a small defined group of people, such as business partners. However, it is understood that the simultaneous multiple death life insurance plan 100 of the first embodiment is not limited to any specific number of insured parties 115 or beneficiaries 125, nor to any particular relationship between insured parties 115 and beneficiaries 125.

The simultaneous multiple death life insurance plan 100 provides coverage for the single risk of simultaneous death of two or more persons and may be provided as a standard plan, wherein causes or events resulting in simultaneous death 155 may be limited to general types of accidents, such as travel-related accidents, or may be highly individualized plans tailored to the specific needs and desires of insured parties 115 and beneficiaries 125. In this vein, the simultaneous multiple death life insurance plan 100 may provide coverage for two or more persons for a single event and/or for a specific period of time with benefits designated for specific financial needs and expenses as a result of simultaneous death 155. For example, a defined group of designated insured parties 115 may include members of a college sports team, a community group or a social club who desire simultaneous death coverage for a single event, such as a planned group vacation requiring air travel, wherein coverage may be provided for the duration of the entire trip as an event or for only a specific period of time, such as air travel time. Death benefits 130 may be designated, for example, as funds to beneficiaries 125 for payment of inheritance taxes.

A feature and advantage of the simultaneous multiple death life insurance plan 100 is the insured risk of simultaneous or coincident death of two or more insured parties 115 as described herein is a highly unlikely event. Therefore, simultaneous death 155 by its nature is an exceptionally low risk for an underwriting insurer 230 to assume. As a result, the extent of underwriting and medical evaluation required by an insurer 230 to provide such low risk life insurance would be minimum and not as extensive as the underwriting requirements of other life insurance products. Since the underwriting and administrative costs incurred to evaluate potential insured parties 115 and to issue a simultaneous multiple death life insurance plan 100 are low, the insurer 230 may translate low costs into affordable premiums. Therefore, the simultaneous multiple death life insurance plan 100 according to the invention may be available to consumers for low, affordable premiums.

Less extensive underwriting and medical evaluation allows the simultaneous multiple death life insurance plan 100 to be available on a simplified, guaranteed basis, wherein potential insured parties 115 are subject to a screening process, such as, for example, requiring responses to one or two qualifying questions designed to prevent anti-selection. In addition, the plan would be issued subject to submission of statements of good health, or some other easily obtainable documentation attesting to the health of the potential insured parties 115. The minimum underwriting requirements, such as the screening process described herein, allows the plan 100 to be issued with ease and in a timely manner. This is particularly advantageous in the event simultaneous death coverage is required for immediate events or circumstances, such as imminent air travel. In other embodiments of the invention, insured parties may obtain simultaneous multiple death life insurance simply and quickly by accessing an underwriting insurer 230 or the computer system of the invention through the internet 92 from remote computers and internet access devices 94 well known in the art, wherein the insured parties 115 provide required underwriting information and credit card information for payment of premium to the underwriting insurer 230 and simultaneous multiple life insurance is issued to the insured parties 115 through the internet 92 upon completion of underwriting and payment transactions. Therefore, the simultaneous multiple death life insurance plan 100 according to the invention is easily and readily obtainable life insurance.

In a fifth aspect of the first embodiment of the invention, the simultaneous multiple death life insurance plan 100 may employ procedures to assess the continued eligibility of designated insured parties 115. For example, assessment of continued eligibility may be linked to renewal procedures for the plan 100 and performed upon payment of an annual premium. Such procedures may include furnishing statements of good health. The eligibility of designated insured parties 115 as members of a defined group may be assessed by employing certification procedures, which require designated insured parties 115 to certify, for instance, they are alive and in good health and continue to be a member of a defined group, e.g. spouses, essential employees, business partners. Such certification procedures may be similarly performed upon payment of an annual premium. In other embodiments of the invention, the procedures to assess continued eligibility of the designated insured parties 115 may be satisfied by insured parties 115 providing renewal information, credit card information for premium payment, as well as other information required to continue coverage, to the underwriting insurer 230 through the internet 92 from remote computers and other internet access devices 94 well known in the art.

In a second embodiment of the invention, simultaneous multiple death life insurance is provided as a rider to an existing underlying or primary life insurance plan held by designated insured parties 115. As described above in the first embodiment, the simultaneous multiple death life insurance rider provides simultaneous death benefits 130 to designated beneficiaries 125 irrespective of the underwriting requirements of the underlying or primary life insurance plan. Death benefits 130 provided to designated beneficiaries 125 under the simultaneous multiple death life insurance rider are also not linked to payment of death benefits 130 by the underlying or primary life insurance plan.

In a third embodiment of the invention, simultaneous multiple death life insurance is provided as a rider to a separate insurance product which provides coverage and/or a benefit other than life insurance coverage and death benefits.

In a fourth embodiment of the invention, a method for providing simultaneous multiple death life insurance for a multiple of insured lives comprises selecting at least two insured lives by a screening process, wherein the screening process includes identifying two or more insured parties and their relationship to each other and to one or more beneficiaries, obtaining underwriting information from the insured parties, for example, in response to one or more antiselection questions designed to establish if the insured parties meet minimum eligibility requirements, comparing underwriting information received from the insured parties with predetermined standards of eligibility, and certifying the insured parties are in good health by requiring statements of good health from the insured parties. The method for providing simultaneous multiple death life insurance further comprises a death benefit amount of a fixed value and defining simultaneous death as 1.) simultaneous death of the insured parties as a result of a common cause or event, 2.) death of the insured parties within a specified period of time, e.g. three months, as a result of a common cause or event, or from any cause or event; or 3.) permanent incapacity of at least one of the insured parties following death of the other insured within a specified period of time, e.g. three months, as a result of a common cause or event, or from any cause or event. As described above with respect to the first embodiment, permanent incapacity may be a condition considered equivalent to death and included in the definition of simultaneous death to the extent death is expected to result within a specified period of time, e.g. six to twelve months. The method of providing simultaneous multiple death life insurance further includes determining a premium obligation amount, identifying an obligation of the insured parties to pay the premium obligation amount in a specified period of time, fixing a term of a specified period of time during which simultaneous multiple death life insurance is valid, and identifying an obligation of the insurer to pay the death benefit amount to the beneficiary in the event of the simultaneous death of the two insured parties.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of providing a simultaneous multiple death insurance policy for one person and another person, the method comprising:

identifying the persons as insured parties under the insurance policy, the insurance policy being a stand-alone policy independent in effect from other insurance benefits either or both persons are eligible for;

obtaining information regarding the persons;

entering information regarding the persons into a data processing apparatus and determining in the data processing apparatus the eligibility of each of the persons by comparing information received regarding each of the persons with one or more standards stored in the data processing apparatus;

entering information related to a death benefit amount into the data processing apparatus, the death benefit amount being based upon a probability of the simultaneous death of the persons, the death benefit amount having a fixed value and being established independent of other risk exposures of either or both persons and independent of one or more other insurance benefits either or both persons are eligible for;

entering information related to at least one beneficiary of the insurance policy into the data processing apparatus;

entering information related to a benefit qualification time frame into the data processing apparatus, the benefit qualification time frame being a term of the insurance policy and defining a predetermined period of time established in the insurance policy between the death of the one person and the death of the another person;

generating the insurance policy using the data processing apparatus from the information relating to the eligible persons, the death benefit amount, the at least one beneficiary, and the benefit qualification time frame, the insurance policy creating an obligation of an insurer to pay the death benefit amount only upon the confirmation of at least one of: (i) simultaneous death of the persons at substantially the same time and (ii) death of both persons within the predetermined period of time of the benefit qualification time frame; and issuing the generated insurance policy without performing medical underwriting of the persons, wherein payment of the death benefit amount is made only if at least one of the aforementioned conditions (i) and (ii) is met, the payment of the death benefit amount being independent of the payment of one or more other insurance benefits either or both persons are eligible for.

2. The method of claim 1 wherein the at least one beneficiary is financially dependent upon at least one of the persons.

3. The method of claim 1 wherein obtaining information regarding the persons includes obtaining responses to one or more questions.

4. The method of claim 1 wherein the insurance policy includes a term to designate a period of time the insurance policy is effective.

5. The method of claim 1 wherein the benefit amount includes a benefit amount of the full fixed value that the insurer is obligated to pay to the at least one beneficiary upon the confirmation of the death of the another person.

6. A method of insuring at least one person and another person, or a defined number of persons, for the risk of simultaneous multiple death, the method comprising:
  a) establishing a benefit amount of an insurance policy, said insurance policy being a stand-alone policy independent in effect from other insurance policies providing benefits for any of said persons, said benefit amount being based upon a probability of the simultaneous death of said at least one and another persons or said defined number of persons and being a term of said insurance policy;
  b) establishing a benefit qualification time frame, said benefit qualification time frame being a term of said insurance policy and defining a predetermined period of time established in the insurance policy between the death of said at least one person and the death of said another person, or between the death of at least one person of said defined number of persons and the death of another or more persons of said defined number of persons;
  c) identifying said persons as insureds under said insurance policy;
  d) identifying at least one beneficiary of said insurance policy;
  e) generating said insurance policy, said insurance policy providing for the payment of said benefit amount only upon the confirmation of at least one of: (i) simultaneous death of said at least one and another persons, or said one and another or more persons of said defined number of persons, at substantially the same time and (ii) deaths of said at least one and another persons, or deaths of said one and another or more persons of said defined number of persons, within said predetermined period of time of said benefit qualification time frame; and
  f) issuing said generated insurance policy without performing medical underwriting of said persons,
  wherein payment of said benefit amount is made only if at least one of said aforementioned conditions (i) and (ii) is met, the payment of said benefit amount being independent of the payment of one or more other benefit payments any of said persons is eligible for.

7. The method of claim 6 further comprising offering said insurance policy as a principal offer to prospective customers.

8. A method of insuring members of a group having at least one group member and another group member for the risk of simultaneous multiple death, the method comprising:
  a) establishing a benefit amount of an insurance policy, said insurance policy being a stand-alone policy independent in effect from other insurance policies providing benefits for any of said group members, said benefit amount having a fixed value and being based upon a probability of the simultaneous death of said group members and being a term of said insurance policy;
  b) establishing a benefit qualification time frame, said benefit qualification time frame being a term of said insurance policy and defining a predetermined period of time established in the insurance policy between the death of said at least one group member and the death of said another or more group members;
  c) identifying said group members as insureds under said insurance policy;
  d) identifying at least one beneficiary of said insurance policy;
  e) said insurance policy providing for payment of said benefit amount only upon the confirmation of at least one of: (i) simultaneous death of said at least one and another group member at substantially the same time and (ii) deaths of said at least one group member and another or more group members within the predetermined period of time of the benefit qualification time frame; and
  f) issuing said generated insurance policy without performing medical underwriting of said group members,
  wherein payment of said benefit amount is made only if at least one of said aforementioned conditions (i) and (ii) is met, the payment of said benefit amount being independent of the payment of one or more other benefit payments any of said group members is eligible for.

9. A method of insuring at least one person and another person or a defined number of persons for the risk of simultaneous multiple death, the method comprising:
  establishing a benefit amount of an insurance policy or a policy rider, said benefit amount being based upon a probability of the simultaneous death of said at least one and another persons, or at least two or more persons of said defined number of persons, said benefit amount being a term of said insurance policy or policy rider;
  establishing a benefit qualification time frame, said benefit qualification time frame being a term of said insurance policy or said policy rider and defining a predetermined period of time between the death of said at least one person and the death of said another person, or between the death of one person of said defined number of persons and the death of another or more persons of said defined number of persons;
  identifying said persons as insureds under said insurance policy or policy rider;
  identifying at least one beneficiary of said insurance policy or policy rider; and
  generating said insurance policy or policy rider from at least the information relating to said benefit amount, said benefit qualification time frame and said beneficiary, said insurance policy or said policy rider providing for the payment of said benefit amount only upon the confirmation of at least one of: (i) simultaneous death of said at least one and another persons. or said one and another or more persons of said defined number of persons, at substantially the same time and (ii) deaths of said at least one and another persons, or deaths of said one and another or more persons of said defined number of persons, within the predetermined period of time of the benefit qualification time frame, wherein payment of said benefit amount is made only if at least one of said aforementioned conditions (i) and (ii) is met, the payment of said benefit amount being independent of the payment of one or more other benefit amounts any of said persons is eligible for further comprising issuing said generated insurance policy or said policy rider without performing medical underwriting of any of said persons.

10. The method of claim 9, wherein said insurance policy is a stand alone policy independent in effect from other insurance policies of any of said persons.

11. The method of claim 10, wherein said insurance policy is a stand alone policy independent in effect from other insurance benefits any of said persons is eligible for.

12. The method of claim 11, further comprising issuing said generated insurance policy without performing medical underwriting of any of said persons.

13. The method of claim 9, wherein said policy rider is independent in effect from other insurance policies of any of said persons.

14. The method of claim 13, wherein said policy rider is independent in effect from other insurance benefits any of said persons is eligible for.

15. The method of claim 14, further comprising issuing said generated policy rider without performing medical underwriting of any of said persons.

* * * * *